March 10, 1964 A. FEINER 3,124,655

TELEPHONE SWITCHING CIRCUIT

Filed Dec. 30, 1959 4 Sheets-Sheet 1

INVENTOR
A. FEINER
BY Henry M. Bissell
ATTORNEY

March 10, 1964 A. FEINER 3,124,655

TELEPHONE SWITCHING CIRCUIT

Filed Dec. 30, 1959 4 Sheets-Sheet 2

INVENTOR
A. FEINER
BY Henry M. Bissell
ATTORNEY

TELEPHONE SWITCHING CIRCUIT

Filed Dec. 30, 1959

4 Sheets-Sheet 3

INVENTOR
A. FEINER
BY Henry M. Bissell
ATTORNEY

TELEPHONE SWITCHING CIRCUIT

Filed Dec. 30, 1959 4 Sheets-Sheet 4

INVENTOR
A. FEINER
BY Henry M. Bissell
ATTORNEY

United States Patent Office 3,124,655
Patented Mar. 10, 1964

3,124,655

TELEPHONE SWITCHING CIRCUIT

Alexander Feiner, Boonton, N.J., assignor to Bell Telephone Laboratories, Incorporated, New York, N.Y., a corporation of New York Filed Dec. 30, 1959, Ser. No. 862,811
27 Claims. (Cl. 179—18)

This invention relates to telephone switching networks and more particularly to such networks employed in electronic switching systems.

Modern telephone switching networks comprise a large number of switching devices arranged in stages throughout the network and interconnected to provide a large number of possible paths to serve any particular pair of subscribers. Each such switching device, which is commonly designated a crosspoint, may be employed in a number of different subscriber connections at distinct periods of time, thus economizing on the total amount of equipment needed to serve a given group of subscribers.

Certain switching networks employ what is known as the commn control system of path selection. That is, rather than provide in every switching device of the network the capability of responding to subscriber signals, e.g., dial pulses, simpler switching devices are utilized which need only respond to signals from the common control equipment which is itself responsive to the subscribers' service requests. The result is a more efficient and economical system capable of functioning with considerably increased speed.

The greater speed of operation of the common control equipment makes it desirable that crosspoint devices are employed which may be controlled by signals shorter in duration than the normal response time of conventional electromechanical relays. Devices which fulfill this requirement while retaining the advantageous properties of mechanical switch contacts are disclosed, for example, in A. Feiner et al. application Serial No. 824,222, filed July 1, 1959, now Patent No. 2,995,637 issued August 8, 1961, R. L. Peek, Jr. application Serial No. 847,919, filed October 22, 1959, now Patent No. 3,059,075, T. N. Lowry application Serial No. 847,918, filed October 22, 1959, now Patent No. 3,037,085 issued May 29, 1962, and J. T. L. Brown application Serial No. 847,935, filed October 22, 1959, now Patent No. 3,005,072. Devices of the types disclosed employ one or more remanently magnetic members to control the state of a pair of magnetically responsive mechanical contacts. The remanent magnetization of the magnetic members is reversible and this magnetization is established by current-carrying control windings in a small fraction of the time required for the magnetically responsive contacts to respond. Such devices have become known as ferreeds because certain embodiments of these structures combine a ferrite material, the remanently magnetic member, with a reed switch of the type described by O. M. Hovgaard et al. in "Development of Reed Switches and Relays," vol. 34, Bell System Technical Journal, page 309.

Because of the disparity between the time duration of the control pulses and the response time of the switch contacts, a ferreed switching device, or relay, may have its remanent magnetization state rapidly reversed a number of times without affecting its contact state. This characteristic is utilized in a telephone switching network of ferreed relays disclosed in R. W. Ketchledge application Serial No. 857,283, filed December 4, 1959, now Patent No. 3,005,876. Many other advantageous results accrue from the use of ferreed switching devices in a telephone switching system.

A considerable saving in the switching network equipment needed to serve a given number of telephone subscribers may be afforded by applying the principles of line to link concentration in the terminal stages of the network. That is, the switching devices in these terminal stages may be interconnected so that a given number of subscriber lines are served by a lesser number of network links.

Further savings in network equipment may be effected by employing a limited access arrangement of switching devices. Such an arrangement provides access for a given subscriber line to less than all of the network links which might be connected to serve that particular line.

A judicious combination of these two expedients is commonly employed to reduce the cost of a telephone system. An arrangement which provides a one-to-one correspondence between telephone lines and network links is wasteful of equipment. At the other extreme, a network having too high a ratio of lines to links degrades the service afforded the customers because of the high degree of blocking that occurs. That is, the customer is likely to find all of the paths available to him in use by other customers when he desires to make a call. Balancing these two considerations to achieve a network which has satisfactory telephone traffic handling capabilities without unnecessary extravagance in switching equipment is one of the principal problems faced in telephone switching network design.

It is also common in telephone systems to designate the subscriber line terminals within an individual switch by numbers which denote the physical location of the terminals. However, for control purposes information is required which designates the equipment associated with an individual terminal in a switch, particularly when limited access of lines to links is afforded.

Switch terminals are customarily designated by decimal numbers, whereas the designation of the network links is more practically given in binary code in view of the fact that these links are selected by bistable switching devices which inherently provide binary output signals for control. Accordingly, where such practices are followed some means of translation must be provided in the concentrating stages of the telephone network so that the particular links capable of serving a particular line may be indicated whenever the line number is known. Translating circuitry is known which may be combined in a switching network to perform this function. However, the addition of such circuitry increases the complexity and cost associated with the network.

Accordingly, an object of this invention is an improved telephone switching network, particularly one utilizing ferreed relays.

A more specific object of this invention is a simplified arrangement for the control of ferreed switching devices in a telephone switching network.

A further object of this invention is an improved arrangement for releasing the switching devices employed in a particular telephone subscriber communication path when that path is no longer needed.

It is a still further object of this invention to provide an improved telephone line concentrating circuit for a telephone system.

A further specific object of this invention is a telephone line concentrating circuit for a switching network which achieves automaitc translation between a switch terminal number and the network links accessible to that terminal.

In describing my invention particular terminology is employed in referring to specific components and groups of components within the switching network. An individual switching device, or relay, is designated a crosspoint. These crosspoints are arranged in coordinate arrays which are referred to as switches. The arrays employed in the described embodiment of my invention employ eight rows of eight crosspoints each and are referred to as 8-by-8 switches. Those switches occupying corresponding positions within the network comprise a stage thereof. Interconnections between the crosspoints of adjacent stages are known as links, each link being considered to include one contact of each of the two crosspoints which it connects.

In one specific embodiment of my invention I provide control of the individual crosspoints in the respective switches by employing cores, of a material such as ferrite, having two stable states of magnetic remanence, as is known in the art, as the access or driving elements for the switches. The crosspoints are arranged in rows and columns in a coordinate matrix array with corresponding control windings thereof connected together. Selection, i.e., operation, of a particular crosspoint is effected by applying concurrent signals of half the requisite switching amplitude to the vertical and horizontal control leads associated with the selected crosspoint. Release of a particular crosspoint is effected, however, by applying a full amplitude pulse of the opposite polarity to the horizontal control lead of the row in which the particular crosspoint is situated. Because of the way in which the links between switching stages are arranged, only one crosspoint in any horizontal row of a particular switch is operated at any particular time. Therefore, if one crosspoint of a switch row is operated, that row is considered busy and no other crosspoint thereof may be employed in another subscriber connection.

Each horizontal control lead of a switch has a particular access core associated with it. This arrangement provides a number of advantageous results in accordance with my invention. For example, the access cores may be controlled on a coincident signal basis, thus simplifying the external control circuitry. Also the ferromagnetic core provides a desirable impedance match between the control circuitry pulse source and the individual crosspoint control windings. Furthermore, the access core readily provides bipolar output pulses which are employed for the crosspoint control. In addition, each access core provides, in correspondence with its own magnetization state, an indication of the busy or idle condition of the crosspoints in the particular row with which it is associated. In this embodiment of my invention I employ as the access core an element having an additional aperture and auxiliary windings for effecting non-destructive readout of the magnetization state of a particular access core.

In symmetrically connected telephone switching networks, it is common to have the respective links connected between a horizontal crosspoint contact multiple of one switch and the vertical crosspoint contact multiple of the succeeding switch. To release a link completely so that it may be ready for use in a subsequent communication path, it is necessary that both of the crosspoints at the opposite ends of the link be released. In this specific embodiment of my invention release of the links comprising a particular communication path through the network is initiated at a particular point thereof by switching an access core to apply a release to the crosspoints of the horizontal row corresponding to the link. In accordance with an aspect of my invention, I employ suitable detection circuitry to detect the pulse induced in the vertically connected control winding of the released crosspoint and provide a designation of the succeeding link connected in the particular communication path to be released. It may be noted parenthetically that the vertical control winding is not otherwise utilized during the release of a particular crosspoint. This aspect of my invention advantageously eliminates the need for the external storage of information relating to the links employed in a particular subscriber connection.

The switches employed in this embodiment of my invention each comprise a square matrix of ferreed crosspoints arranged in eight rows of eight crosspoints each.

In accordance with an aspect of my invention the line concentrating portion of my switching network employs the same switch structure having particular contact connections of the respective crosspoints thereof to provide in effect a 4-by-16 switch in one instance and a double 4-by-8 switch in another instance. The effective 4-by-16 switch is realized in a physical 8-by-8 crosspoint structure utilized in the first stage of the concentrator by connecting each vertical contact multiple to only four out of the eight crosspoints in its column. Moreover, in accordance with a further aspect of my invention these connections are provided so that one of each succeeding pair of horizontal contact multiplies may be connected to a vertical contact multiple on a binary code basis which affords automatic translation of the switch terminal so that the links accessible to that terminal are readily designated. By connecting succeeding pairs of these horizontal contact multiples to vertical multiples of the double 4-by-8 switches constituting the succeeding line concentrator stage, there is achieved, in accordance with an aspect of my invention, an advantageous concentration of telephone lines to network links so that for a particular concentrator group every network link connected to the group has access to all of the telephone lines of the concentrator group. The effect on any individual customer of telephone traffic congestion due to other customers sharing the same first-stage switch is reduced because each line switch terminal has a unique link access pattern which is distinct from those of other terminals in the same switch. Furthermore, this particular concentrating arrangement is extremely economical in the amount of equipment which must be assigned each line. It will be noted that within the first stage of the concentrator only four crosspoints are required for each subscriber line. However, from a telephone traffic standpoint the arrangement is superior to a straight 8-by-4 concentrating array which also requires four crosspoints per line.

It is a feature of my invention that a communication switching network include a stage of relay structures having remanently magnetic elements, the state of magnetization of which is determined by output pulses produced in an associated magnetic core matrix.

It is another feature of my invention that the magnetic cores in the matrix have circuitry associated therewith to indicate the busy or idle condition of the crosspoints or relay structures associated with each such core in addition to their control of the magnetization condition of such crosspoints. Further in accordance with this feature of my invention such busy or idle condition is indicated by nondestructive sensing or interrogation of the cores.

It is an additional feature of my invention that an output signal generated during the release of a particular crosspoint in one stage of the switching network be utilized as an indication of the location of a crosspoint in another stage of the switching network associated with the first in a communication path.

It is still another feature of my invention that the cores in each magnetic core matrix be arranged in a coordinate array with separate pulse sources for each coordinate, the one coordinate pulse source being controlled by detection circuitry operated on release of the crosspoint in the succeeding switching stage, and the second coordinate pulse source being operated by the output of the first coordinate pulse source of the succeeding stage in the switching network.

It is a further feature of my invention that such a switching network include at least a first and second concentrator stage and a third switching stage on each side of a junctor circuit.

It is yet a further feature of my invention that in the concentrating stages of the network the crosspoint connections are arranged in accordance with a binary code translation of the subscriber line number so as to afford automatic translation of any line number to its associated link number.

Still a further feature of my invention is the provision in the concentrating stages of the switching network of connections between subscriber lines and alternate groups of links so that two lines may be served by a single column of crosspoints within the same switch.

A complete understanding of this invention and of these and various other features thereof may be gained from consideration of the following detailed description and the accompanying drawing, in which.

Figure 1:
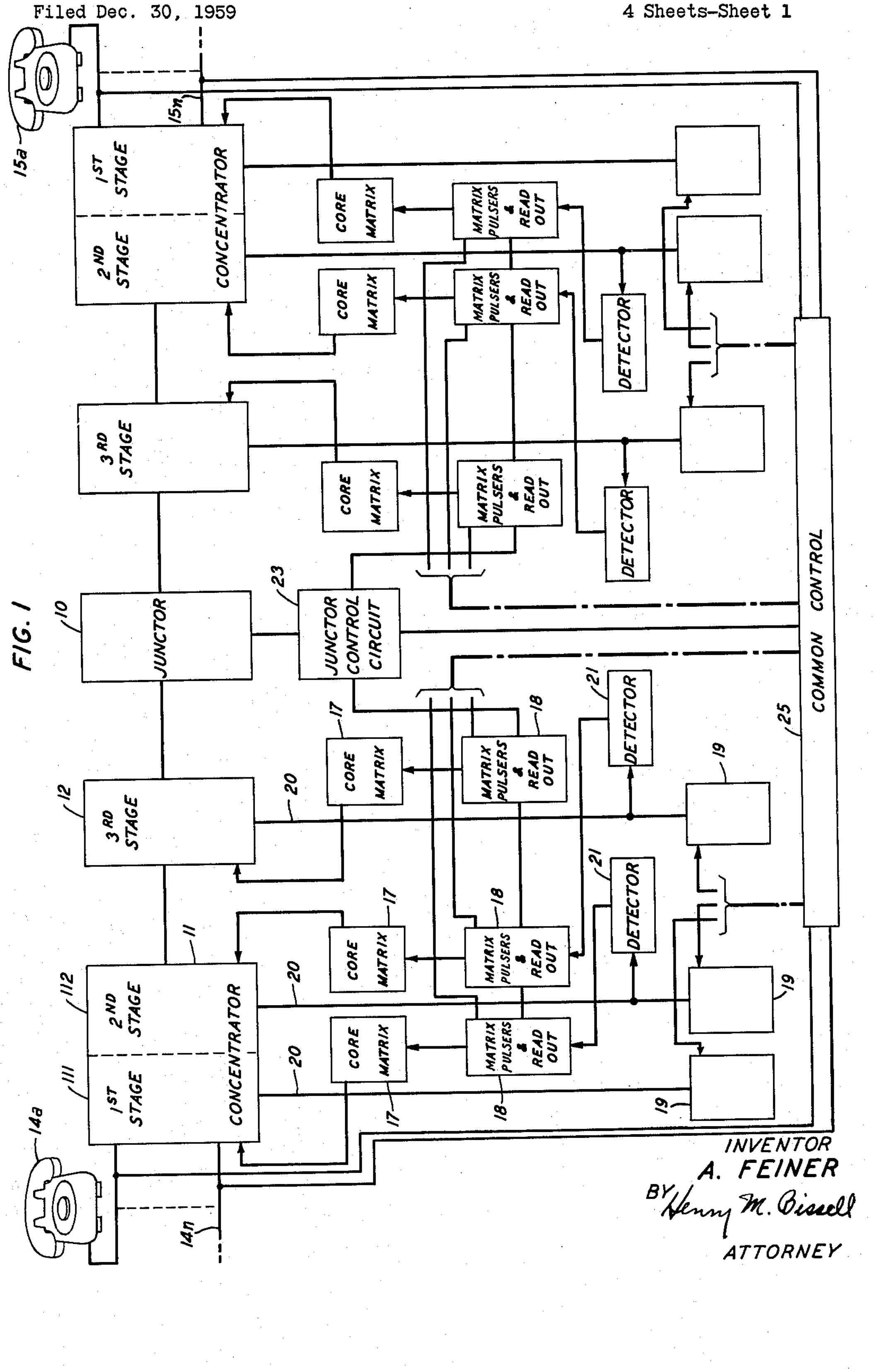
FIG. 1 depicts in block diagram form a telephone switching network in accordance with one specific illustrative embodiment of my invention.

Turning now to the drawing, FIG. 1 depicts one illustrative embodiment of my invention wherein a switching network comprises six switching stages divided in two halves, which are mirror images of each other, by a junctor circuit 10. Each half of the switching network includes a first and a second switching stage, which together comprise a concentrator 11, and a third stage 12; the first and second concentrator stages are shown included in the concentrator 11 and are designated stages 111 and 112, respectively. Telephone line circuits are connected to the first switching stages and are designated, schematically, by the telephone subsets 14 and 15 at opposite sides of the network.

Associated with each switching stage are a magnetic core matrix 17 and the related matrix pulse sources and readout circuitry as indicated by the circuits 18. As further described below, the horizontal control signals for the crosspoint relays are provided by the core matrices 17 while the vertical control signals are provided by the vertical drive pulse sources 19 over vertical control leads 20. Detector circuits 21 are also connected to the control leads 20 of the second and third switching stages 112 and 12 for utilization in the release of a path through the switching network. A junctor control circuit 23, described further below, detects the occurrence, at the junctor, of a disconnect signal from either side of the switching network and initiates the release operation. The switching network, in accordance with my invention, is intended for utlization in conjunction with a common control circuit 25, which may be of a type known in the art, which monitors the subscriber subsets, receives and stores the dialed digits, and provides the requisite control signals and logic and memory functions as is known for the operation of telephone switching systems.

Figure 2:
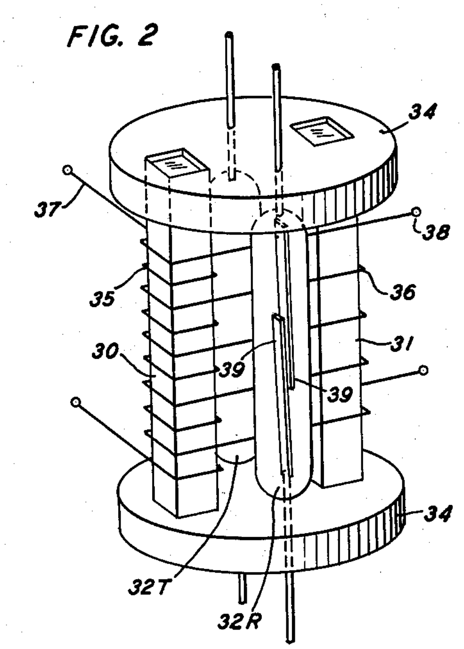
FIG. 2 depicts a particular ferreed structure which may be employed in the embodiment of my invention depicted in FIG. 1.

Each of the switching stages comprises a plurality of ferreed relays interconnected in particular patterns in accordance with aspects of my invention, as described further below. Each of the ferreed relays may be of the types disclosed in A. Feiner et al. application Serial No. 824,222, filed July 1, 1959, though such structures are merely representative of the types that may be employed in different embodiments of my invention. One such structure, as depicted in the above-mentioned Feiner et al. application, is shown in FIG. 2 and comprises a pair of remanently magnetic members 30 and 31 of a material exhibiting a plurality of stable remanent magnetization states. A pair of magnetically responsive reed switches 32T and 32R is shown parallel to the members 30 and 31; while, as depicted in FIG. 2, each relay in this embodiment of my invention includes a separate crosspoint for the tip and ring conductors; in order to simplify the subsequent description and the drawing only a single wire will be referred to. However, while the discussion will be on a single wire basis, it should be kept in mind that the switching network is advantageously on a two wire basis with separate relay crosspoints in each stage for the tip and ring conductors.

End pieces 34 of a magnetically permeable insulating material, such as may be formed by mixing a powdered ferrite in a plastic binder, are employed to position the members 30 and 31 and the switches 32 and to complete the magnetic circuit of the relay. Windings 35 and 36 having respective terminals 37 and 38 are wound about the members 30 and 31. It will be noted that the winding 35 is wound on the member 30 alone while the winding 36 encompasses both the members 30 and 31 in the same winding sense.

Figure 3:
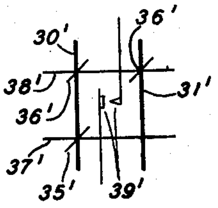
FIG. 3 is a schematic symbol representing the structure depicted in FIG. 2.

FIG. 3 represents the schematic symbol of the relay of FIG. 2 in accordance with the mirror symbol convention for magnetic cores described in "Pulse-Switching Circuits Using Magnetic Cores" by M. Karnaugh, vol. 43, Proceedings of the I.R.E., page 57. However, this schematic is not intended to be restricted to the relay of FIG. 2, as employed in the depicted embodiment of my invention, but is considered representative of other ferreed relays which may be similarly utilized. In FIG. 3 the heavy vertical lines 30′ and 31′ correspond to the remanently magnetic members 30 and 31 of FIG. 2. The short lines 35′ and 36′ represent the windings 35 and 36 while the horizontal lines 37′ and 38′ represent the connections to or terminals for the respective windings. The elements 39′ are shown to represent the contacts 39 of an associated magnetic reed switch 32.

In the operation of the relay depicted in FIGS. 2 and 3, closure of the contacts 39 is effected by applying concurrent pulses to the terminals 37 and 38, respectively. These concurrent control signals are individually insufficient to change the magnetization state of the remanently magnetic member 30 but in combination they switch the remanent magnetization of the member 30 to an upward direction. The magnetization state of the remanently magnetic member 31 is unchanged during the operation of the relay. During fabrication of the device, the member 31 is strongly magnetized in the upward direction and thereafter maintained in this remanent magnetization state. The winding 36 associated with the member 31 prevents the partial reversal of the magnetization state thereof which might otherwise occur when the member 30 is switched to the upwardly directed magnetization condition. Release of the relay is effected by applying a full amplitude control signal of the opposite polarity to terminal 37 thus switching the remanent magnetization of the member 30 to the downward direction. During this reversal of magnetization of the member 30 the direction of induced magnetix flux in the member 31 is the same as that already existing therein. Accordingly, it is not necessary to provide against partial demagnetization of the member 31 during release of the relay.

It will be noted that during the release of the relay, no control pulse is applied to the terminal 38 and the winding 36 is idle. The reversal of magnetization in the member 30 induces a signal on the winding 36 which is employed in accordance with an aspect of my invention in the switching network to provide an indication of the location of a particular relay released by a control pulse applied to its terminal 37.

Figure 4:
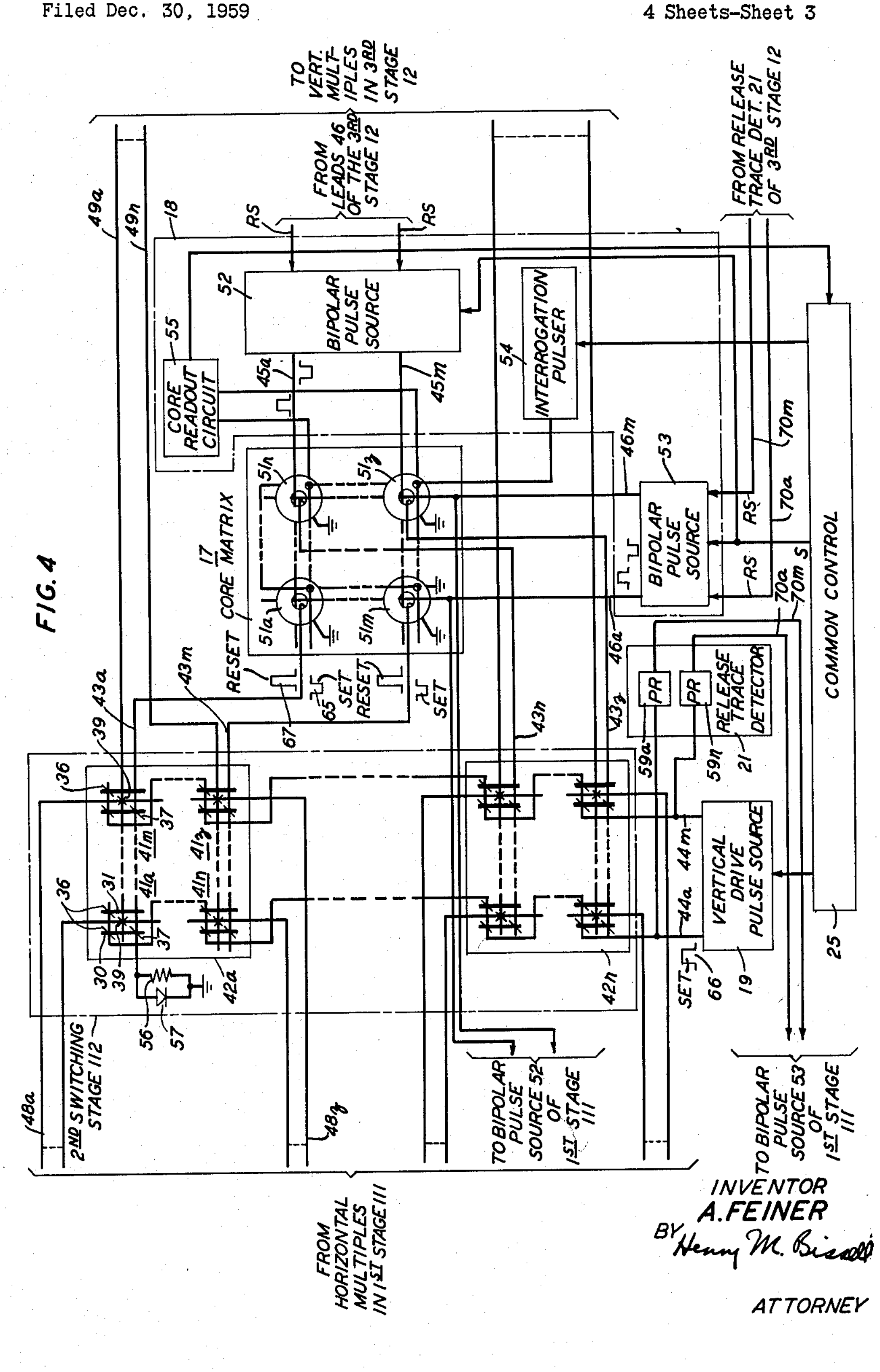
FIG. 4 is a more detailed block diagram of the second switching stage and the control circuits therefor of the embodiment of my invention depicted in FIG 1.

FIG. 4 depicts one stage of the switching network illustrated in FIG. 1, together with its associated control and pulse circuitry; specifically, there is depicted in FIG. 4 a portion of the second stage 112 of the switching network comprising a plurality of ferreed relays 41 arranged in respective switches 42, the relays being of the type depicted in FIG. 2 and being illustrated by the schematic representation above described with respect to FIG. 3. The horizontal and vertical contact connections for the switches 42 are shown in simplified form, the connections actually being as shown at switches 82 in FIG. 7 and described in detail below; further, for simplicity certain of the crosspoints in the switches 42 are omitted, as is indicated by the dashed lines between those actually shown. The windings 37 of those crosspoints in a particular row are connected in series to corresponding horizontal control leads 43 while the windings 36 of the crosspoints in particular columns are connected in series to corresponding vertical control leads 44. Thus a particular crosspoint such as 41*a* may be selected, i.e., operated, by applying concurrent pulses to the leads 43*a* and 44*a*. However, as has already been explained, the crosspoint 41*a* may be released by applying a single pulse of the opposite polarity to the lead 43*a*.

The core matrix 17 comprises a plurality of magnetic cores 51 and, among other functions in the circuit in accordance with my invention, serves as a horizontal access circuit for the crosspoints 41. The magnetic cores 51 are in turn controlled on a coincident signal basis by bipolar pulse sources 52 and 53, included in the matrix control circuit 18. In addition, the magnetization state of an individual core 51 may be ascertained by associated circuitry comprising the interrogation pulser 54 and the core readout circuit 55. Each core 51 has a main aperture and an auxiliary aperture. A core 51 is set by coincident pulses from the pulse sources 52 and 53 applied on leads 45 and 46, respectively, which thread the main aperture of the core. Individual output windings connected to the leads 43 also thread the main apertures. The auxiliary apertures are threaded by leads from the interrogation pulser 54 and the core readout circuit 55, included in the matrix control circuit 18, so that the magnetization state of a core may be ascertained without changing that state, as is known in the art.

The common control circuit 25 is connected to the respective pulse circuits for exerting over-all control of the switching network.

The reversal of magnetization in a core 51 produces a signal on its output winding, the polarity of which depends on the direction of magnetization reversal. The crosspoints 41 are controlled by these core output signals and by pulses from the vertical drive pulse source 19. For example, the crosspoint 41*a* may be selected, i.e., its contacts 39 may be closed, by the concurrent application of Set pulses 65 and 66 to control leads 43*a* and 44*a*, respectively. As already explained, the crosspoint 41*a*, as well as any other crosspoint in the same horizontal row, may be released by the application of a single Reset pulse 67 to the control lead 43*a*.

The pulses 65, 66, and 67 as depicted in FIG. 4 represent the amplitude of the currents flowing in the control leads 43 and 44. The oppositely directed currents 65 and 67 of different magnitudes may advantageously be developed on the output winding of a core 51, by providing different impedances in the return path for the two directions of current. For example, the return path for lead 43*a* may comprise a resistor 56 and diode 57 in parallel so that current flows through the resistor 56 and is blocked by the diode 57 for current pulse 65 in one direction while it bypasses the resistor 56 and flows through the diode 57 for current pulse 67 in the other direction. While only one such return path has been depicted, it is to be understood that such a return path may be connected to each lead 43.

In FIG. 4 the contacts 39 of the crosspoints 41 are represented by X's. One contact of each pair is connected in common to corresponding contacts in the same group, either row or column, as is known in the art, which common connections may be referred to as horizontal or vertical multiples, as the case may be. In accordance with an arrangement which is described in greater detail in connection with FIG. 7, there are two connected contact groups, or vertical multiples, for each column of crosspoints in each switch of the second switching stage depicted in FIG. 4. The horizontal multiples are connected to, and constitute a part of, links 49 which may connect to vertical multiples in the succeeding stage, while the vertical multiples are similarly connected as part of the links 48 which may connect to horizontal multiples in the preceding stage of the switching network. The pattern of control winding connections depicted in FIG. 4 is typical of the control arrangement of each stage of the network. This pattern is independent of the particular crosspoint contact connection pattern which may differ from stage to stage.

With the links and crosspoints interconnected in this fashion, it is clear that a communication path through the network comprises a plurality of links electrically joined together by operated crosspoints. To completely release a particular link, both crosspoints at its opposite ends must be released. However, the release of one of these crosspoints specifies the other crosspoint, since the two are permanently associated by the interconnecting link between them. This characteristic is utilized to advantage in one aspect of my invention which will now be described.

Each stage of the switching network, such as the second stage 112 depicted in FIG. 4, has connected thereto the release trace detector circuit 21 comprising a plurality of trigger devices or pulse regenerators 59, which may advantageously be monostable multivibrators of a type known in the art, individually connected to the vertical control leads 44. Output leads 70 from the respective pulse regenerators 59 are connected to reset leads of the core matrix column control pulse source, similar to the source 53, of the preceding stage, which in this instance is the first stage 111. Reset leads of the pulse source 53 in the second stage 112 are similarly connected correspondingly to release trace detector output leads 70 from the third stage 12; in the case of the third stage 12, which in this embodiment is adjacent the network junctor circuit 10, its pulse source 53 is connected to the junctor control circuit 23.

Individual connections are also shown from the leads 46 to the core matrix row control pulse source 52 of the preceding or first stage 111 while reset leads of the source 52 of this second stage 112 are connected to the vertical control leads 46 of the core matrix 17 of the succeeding third stage 12; for the third stage 12 the reset leads of the pulse source 52 are connected to the junctor control circuit.

As has already been explained, the crosspoint contacts 39 are interconnected by interstage links so that a vertical column of contacts 39 of one stage switch is connected to a horizontal row of contacts 39 of a preceding stage switch. These link connections are permanently established in a pattern by which the switch and column locations of the crosspoints at one end of a link designate the switch and row locations of the crosspoints at the other end of the link. For example, within the network the vertical multiples of the first switch in the third stage are consecutively connected to the first row multiples of each of the switches of the second stage, the vertical multiples of the second switch of the third stage to the second row multiples of the second stage switches, et cetera. In addition, it will be noted that the rows and columns of the cores 51 of the core matrix 17 are connected correspondingly according to the row and switch positions of the associated switches 42.

The reset pulse applied to a particular row 43 of crosspoint contacts 39 actually resets only the crosspoint of that row which had been priorly operated. The magnetization reversal of the operated crosspoint generates a pulse on the corresponding vertical control lead 44 which is applied to the appropriate pulse regenerator 59. In accordance with my invention, this signal is employed to designate the operated crosspoint at the other end of the interstage link.

Release of an established communication path proceeds from stage to stage and link to link. Row address signals of the particular crosspoint to be released within the second switching stage 112 depicted in FIG. 4 are received from the third switching stage 12 to the right thereof, as indicated. Pulse sources 52 and 53 select the associated core 51 to be reversed which in turn applies a reset pulse 67 to the designated row 43. The resulting output signal on a vertical control lead 44, regenerated by the associated pulse regenerator 59, and the core drive signal from the bipolar pulse source 53 are applied to the respective bipolar pulse sources controlling the preceding stage to release the next operated crosspoint in the path. Thus, in accordance with my invention, path release is effected within a network stage with a minimum of auxiliary control equipment.

Figure 5:
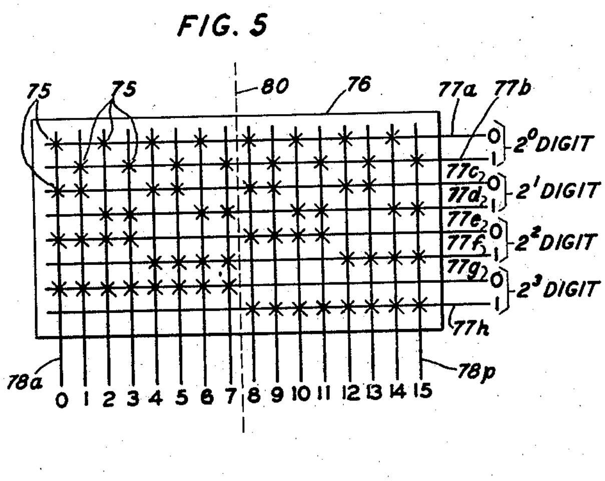
FIG. 5 is a diagram of a switch in the first stage of the illustrative switching network of my invention depicted in FIG. 1.
Figure 6:
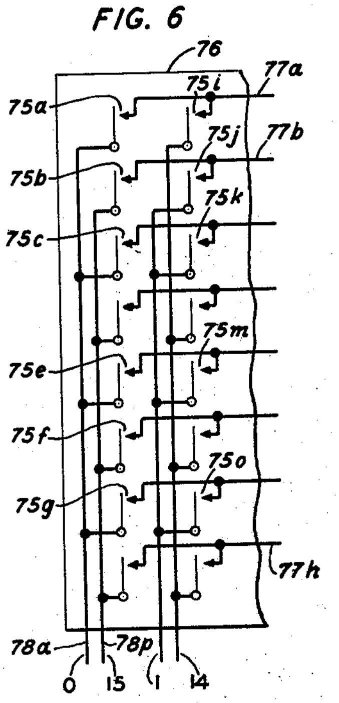
FIG. 6 depicts a portion of the switch of FIG. 5 connected in accordance with another aspect of my invention.
Figure 7:
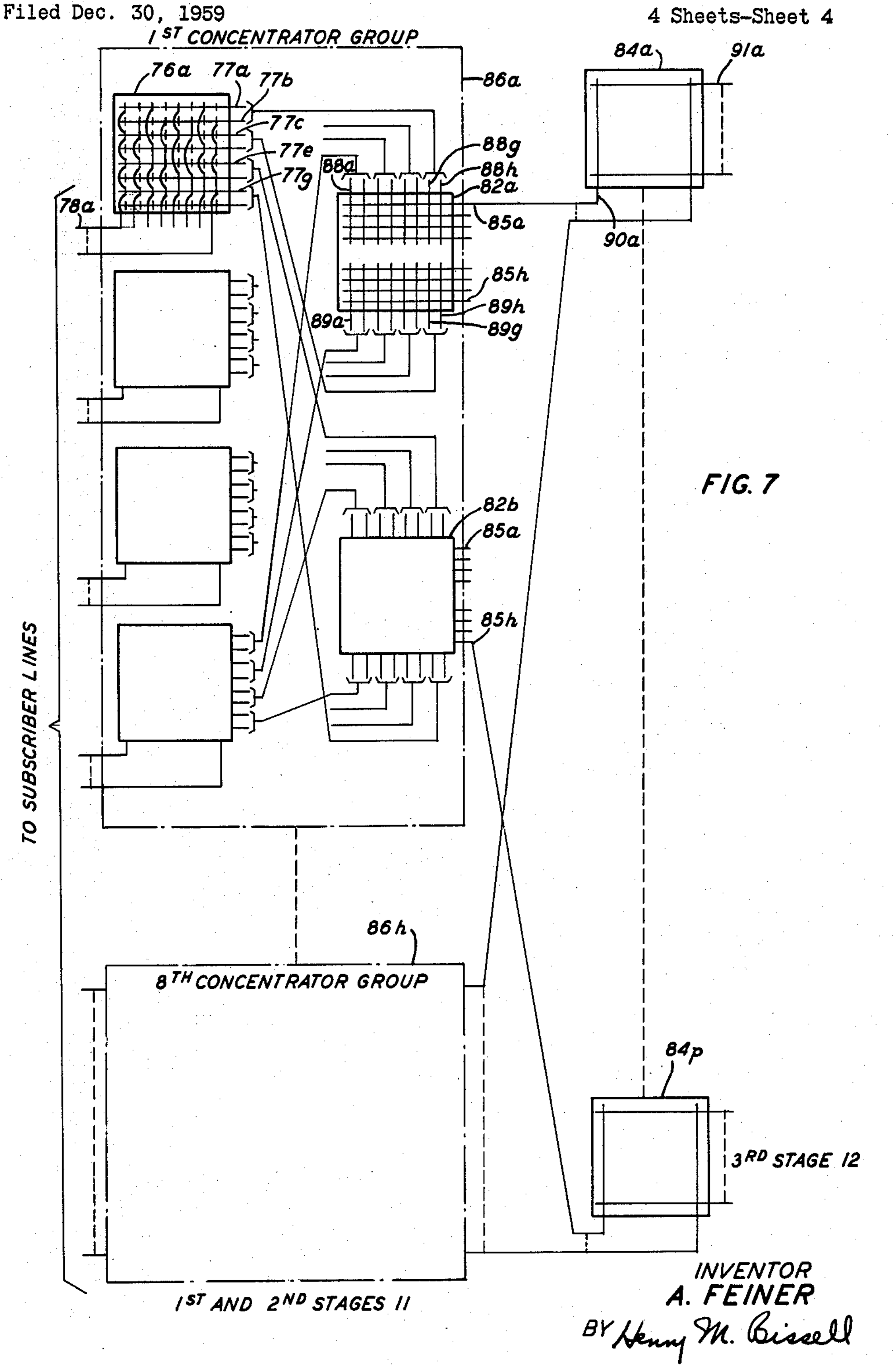
FIG. 7 depicts in greater detail the communication path interconnections of switches in the first, second and third stages of the switching network depicted in FIG. 1 in accordance with other aspects of my invention.

The arrangement of the switches and crosspoints in the first and second stages 111 and 112 of the concentrator group 11 in the switching network depicted in FIG. 1 is depicted in FIGS. 5, 6 and 7, in accordance with other aspects of my invention. Turning now to FIG. 5, there is depicted a diagram of a switch in the first stage 111 of the line concentrating circuit of the switching network of my invention arranged to show the crosspoint connections within the switch. Control windings of the crosspoint devices have been omitted for clarity. In FIG. 5 a plurality of crosspoint contacts 75, indicated each by an *x*, are arranged in a switch 76 with connections 77 and 78 provided to selected rows and columns, respectively, of crosspoints. The horizontal connections 77 in accordance with an aspect of my invention are segregated by pairs and designated with a binary digit. The vertical connections 78 are designated with a decimal number as is customary.

Since there are sixteen vertical connections, each may be represented by a distinct binary number of four digits, each digit being either a zero or a one. Thus each such four-digit binary number represents a selection of four-out-of-eight possible binary code elements. In accordance with my invention, these eight elements are represented by the eight horizontal multiples 77, and a pattern of crosspoints is provided within the switch 76 so that only four horizontal multiples 77 may establish a connection with any particular vertical multiple 78 through crosspoints 75. In particular, this pattern of crosspoint location within the switch 76 is so arranged that the specific horizontal multiples 77 which may be connected to a particular vertical multiple 78 are designated simply by translating the vertical multiple decimal number into binary code. For example, the binary code translation of the decimal number 0 is 0000 and it will be noted that crosspoints 75 are arranged to provide connections between the vertical multiple 78*a* and only the four horizontal multiples 77*a*, 77*c*, 77*e* and 77*g*. Similarly, the vertical multiple 78*p* bearing the designation "15" can be connected through crosspoints 75 to the horizontal multiples 77*b*, 77*d*, 77*f* and 77*h* only. Thus, in accordance with my invention, each vertical multiple 78 has a pattern of crosspoint connections which is distinct from the patterns of the other vertical multiples in the switch.

Furthermore, because of the complementary nature of the binary code translation of respective pairs of decimal numbers such as 0 and 15, 1 and 14, 2 and 13, et cetera, the vertical multiples 78 can be arranged by pairs in accordance with my invention to share respective vertical groups of crosspoints 75. Thus the pattern depicted in FIG. 5 may be folded about the central vertical dashed line 80 and it will be noted that the crosspoints on the right fill in the gaps in the pattern on the left to comprise a solid 8-by-8 crosspoint switch. The physical development of this folded matrix is shown more clearly in FIG. 6.

FIG. 6 depicts a portion of a switch 76 connected in accordance with an aspect of my invention to provide the first stage 111 in the concentrator portion 11 of my switching network. Two vertical columns of contact pairs 75 are shown. The corresponding contacts of those pairs in a particular horizontal row are tied together to a common horizontal multiple 77. The remaining contacts are connected together to vertical multiples in accordance with the binary code translation pattern explained in connection with FIG. 5. For example, contacts of the pairs 75*a*, 75*c*, 75*e* and 75*g* are connected together to the vertical lead 78*a* which is given the decimal number 0. In the same vertical column of crosspoint contacts 75 the remaining pairs are connected together to a vertical lead 78*p* designated by the decimal number 15. The numbers 0 and 15 have complementary binary code translations, 0000 and 1111, respectively. Thus the two switch terminals may share the same vertical column of crosspoints. In the second column from the left in FIG. 6 common connections are provided to crosspoints 75*j*, 75*k*, 75*m* and 75*o* representing the binary code number 0001 which is a translation of the decimal number 1 designating that vertical multiple. The remaining crosspoints in that column represent the binary number 1110, which is the translation of the decimal number 14, and are connected together to the vertical multiple designated 14. The remainder of the crosspoints in the switch 76 not shown in FIG. 6 are connected in similar fashion so that, in accordance with my invention, an 8-by-8 switch structure is rendered capable of providing connections between sixteen input terminals and eight output terminals on four-out-of-eight basis, thus providing in effect a 4-by-16 switch in a physical 8-by-8 configuration. The connection of the horizontal multiples 77 to the second stage 112 of the network in accordance with my invention will be more readily understood by reference to FIG. 7.

FIG. 7 depicts a portion of the telephone switching network in accordance with my invention including the first, second and third stages 111, 112 and 12, respectively. In the figure, a plurality of switches 76 and 82 are shown interconnected to constitute the concentrator group 11. The switches 76, which comprise the first stage 111, are connected as described in connection with FIGS. 5 and 6. In FIG. 7, crosspoints are indicated by the intersection of a horizontal with a vertical multiple connection. The vertical multiple connections for the first eight lines only are shown in switch 76*a*, the remainder being omitted for simplicity. In the second switching stage 112 comprising the switches 82 the crosspoints are connected by groups as shown in the switch 82*a*. It will be observed that the vertical multiples of this switch are split at the middle of the switch, thus in effect providing two 4-by-8 arrays in each 8-by-8 switch 82. The third switching stage 12 comprises the switches 84 and is shown having individual connections to the horizontal multiples 85 of the concentrator groups 86 of the concentrator 11. Certain of the interconnections and crosspoints have been omitted from FIG. 7 for simplicity but the pattern employed in this embodiment of my invention will be clear from an examination of the depicted crosspoints and interconnecting links.

The access pattern of my invention will be apparent from a consideration of the crosspoint connections within the first concentrator group 86*a*. As has already been described, each input line such as 78*a* of the switch 76*a* has access to one of each pair of horizontal multiples 77. These horizontal multiples 77 are connected by pairs to vertical multiples 88 in the second stage switches 82. For example, horizontal multiples 77*a* and 77*b* are connected to vertical multiples 88*g* and 88*h*, the next pair of horizontal multiples 77 is connected to vertical multiples 89*g*, and 89*h*, et cetera. Thus, each line such as 78*a* has access to a vertical multiple in each half of the second stage switches 82. Furthermore, each vertical multiple in any half of a switch 82 has full access to the four horizontal multiples 85 of that half. Thus, in accordance with my invention, each input line of a concentrator group has access to each output link thereof. Furthermore, the access pattern for each line through a first stage switch is distinct from all other lines in that switch, thus advantageously affording increased protection against blocking of any particular customer due to high traffic demands by other customers.

In FIG. 7, eight concentrator groups 86 are indicated, each serving 64 subscriber lines and each having sixteen output links. These output links are then connected to vertical multiples 90 in sixteen third stage switches 84 in a symmetrical pattern being connected by switches 84 to horizontal multiples 91. Additional network stages may be provided and extra concentrator groups and network switches may be added to handle a larger number of subscribers, if desired.

Turning now again to FIG. 1, the operation of this specific embodiment of my invention will now be discussed. Telephone sets 14 and 15 are representative of a plurality of such sets connected at the opposite ends of the network. Let us suppose that the set 14*a* initiates a request for a communication path to set 15*a*. The service request is detected by common control circuit 25 which energizes interrogation pulsers 54 in the matrix control circuits 18 to interrogate the core matrices 17 to determine the existence of idle links within the switching stages. During this interrogation process the readout circuit 55, FIG. 4, detects the state of the respective cores within the core matrix 17 as they are pulsed by the interrogation pulser 54. When the existence of idle links which may be employed to provide the desired communication path is ascertained, the common control circuit 25 triggers the pulse sources 52 and 53 in each circuit 18 to cause the core matrices 17 to apply half amplitude set pulses to the horizontal control leads of the selected crosspoints. Simultaneously, the common control circuit 25 also energizes vertical pulse sources 19 to produce concurrent half amplitude set pulses on the vertical control leads of the selected crosspoints. As the selected crosspoints close, the junctor circuit 10 is also operated by the junctor control circuit 23, energized by common control circuit 25, to complete the communication path between the two halves of the network.

When a particular communication path is to be disconnected, the change of switch hook condition at one of the telephone sets 14*a* or 15*a* is observed by the junctor control circuit 23 which thereupon applies reset pulses to bipolar pulse sources 52 and 53 in the third stage matrix control circuits 18 to initiate the disconnection of the path by the path release procedure described in connection with FIG. 4. The junctor circuit 10 may include a plurality of relays of the type described above with reference to FIGS. 2 and 3, there being one relay for each connection from each third stage 12. Interposed between each two relays in the junctor from complementary crosspoints in the two third stages 12 is a capacitor which provides a speech communication path between the two halves of the network and which affords direct current (D.C.) isolation between the two halves. Connected to a point between each relay and the isolating capacitor in this path is a supervisory detector in the junctor control circuit 23, which detector detects the change of D.C. condition of the communication path and in response thereto transmits a pulse to both pulsers 52 and 53 of the third stages 12 and also causes release of the junctor relay itself.

As each stage of the network path is released, a signal is produced on the corresponding vertical control winding of that stage which is applied to a detector circuit 21. The output of the detector circuit 21 is applied to the pulse source 53 of the preceding network stage and the output of pulse source 53 is applied to the pulse source 52 of the preceding network stage, thus permitting the path release function to proceed stage by stage until all the crosspoints employed in the communication path have been released.

It is to be understood that the above-described arrangements are illustrative of the principles of the invention. Numerous other arrangements may be devised by those skilled in the art without departing from the spirit and scope of the invention.

What is claimed is:

1. A communication switching network comprising a plurality of relay structures including members having two stable remanent magnetic states and windings magnetically coupled to said members, each of said relay structures being operable responsive to partial switching pulses in said windings of a predetermined combined magnitude, column circuit means interconnecting certain of said windings in vertical columns, row circuit means interconnecting certain other of said windings in horizontal rows, means for applying partial switching pulses to said column circuit means, and pulse source means for applying partial switching pulses to said row circuit means, said partial switching pulses in said column and row circuit means having a combined magnitude substantially equal to said predetermined combined magnitude, said pulse source means including a matrix of magnetic cores having a pair of stable remanent magnetic states, coordinate pulse means for switching the state of each of said cores, and winding means on each of said cores and connected to said row circuit means.

2. A communication switching network in accordance with claim 1 wherein said magnetic core matrix includes one core for each row of said relay structures.

3. A communication switching network in accordance with claim 2 further including means for nondestructively interrogating each of said cores in said matrix to determine the availability of a row of said relay structures in the switching network.

4. A communication switching network in accordance with claim 3 further comprising nonreciprocal terminating means for said row interconnecting circuit means whereby said magnetic cores produce first polarity pulses of one amplitude for partial setting of said relay structure magnetic members and second pulses of the opposite polarity of a larger amplitude for complete resetting of said relay structure magnetic members.

5. A communication switching network comprising a plurality of stages of relay structures each including members having two stable remanent magnetic states, contact means controlled thereby, and windings magnetically coupled to said members, means interconnecting certain of said windings in vertical columns, means interconnecting certain other of said windings in horizontal rows, a magnetic core matrix comprising a plurality of cores having a pair of stable remanent magnetic states, there being one core for each row of said relay structures, pulse means for switching said cores in said matrix to release the contact means of relay structures in said rows associated with said cores, detector means connected to said column interconnecting means, and means connecting said detector means of one stage of the switching network to said pulse means of an adjacent stage of the switching network.

6. A communication switching network in accordance with claim 5 wherein said cores are arranged in said matrix in a coordinate array, said pulse means including a first pulser circuit for one coordinate of said array and a second pulser circuit for the second coordinate of said array, said means connecting said detector means to said adjacent stage pulse means including means connecting said detector means to said one coordinate pulser, and further comprising means connecting the output of said one coordinate pulser in said one stage to said second coordinate pulser in said adjacent stage.

7. A communication switching network in accordance with claim 6 further including a junctor circuit and wherein said stages include at least a concentrating stage and one other stage on each side of said junctor circuit and connected thereto.

8. A communication switching network in accordance with claim 7 in which said concentrating stage comprises a first and second stage switch each having a plurality of relay structures having their contact means arranged in rows and columns, first means connecting said contact means in a row of said first stage switch to selected contact means in a column of said second stage switch, said first stage switch rows being designated by binary code elements, and second means connecting selected ones of said contact means in columns of said first stage switch in two numbered groups per column so as to provide an access pattern between said groups and said rows in accordance with the binary code translation of said group numbers.

9. A communication switching network in accordance with claim 8 wherein said first means comprises means for connecting pairs of said rows bearing the same binary digit designation in said first stage switch to different groups of said column connected contact means in said second stage switch.

10. A communication switching network comprising a plurality of lines, a plurality of crosspoints arranged in horizontal and vertical groups in a plurality of switches for providing communication paths between selected ones of said lines, a plurality of links respectively connecting certain of said horizontal and vertical groups of said crosspoints in adjacent ones of said switches, means for ascertaining the availability of certain of said links in establishing a desired one of said communication paths, means for actuating predetermined ones of said crosspoints connected to said links, said actuating means comprising a plurality of remanently magnetic cores, one of said cores being individually associated with each of said horizontal groups of crosspoints, and means for detecting the vertical position within its group of an actuated crosspoint.

11. A telephone switching network in accordance with claim 10 wherein each said remanently magnetic core comprises a structure having a main aperture, an auxiliary aperture, and coordinate drive and output windings threading said main aperture, and said ascertaining means comprises interrogation and readout windings threading said auxiliary aperture for determining the magnetization condition of said structure without changing said magnetization condition.

12. A telephone switching network in accordance with claim 10 wherein said detecting means includes pulse detector circuit means individually associated with each of said vertical groups of crosspoints.

13. A telephone switching network in accordance with claim 10 wherein each of said crosspoints comprises an electromagnetically controlled relay having a remanently magnetic member of a material exhibiting a plurality of stable remanent magnetization states and a movable contact member responsive to the magnetization state of said remanently magnetic member.

14. A telephone switching network comprising a plurality of numbered lines, a plurality of links designated by elements in binary code, a plurality of crosspoint devices for selectively connecting said lines and said links, said crosspoint devices being operably arranged with respect to said lines and said links such that each of said lines is connectable by crosspoint devices to a different group of said links, the particular group of links being determined by the binary code translation of the number of a particular line, and means for selectively controlling said crosspoint devices.

15. A line concentrating circuit of a telephone switching network comprising a plurality of crosspoint devices arranged in rows and columns of eight crosspoint devices each in first and second stage switches, first means connecting those crosspoint devices in a row of said first stage switch to selected crosspoint devices in a column of said second stage switch, said first stage switch rows being designated by binary code elements, second means selectively connecting said crosspoint devices in columns of said first stage switch in two numbered groups per column so as to provide an access pattern between said groups and said rows in accordnace with the binary code translation of said group numbers, and means for selectively actuating said crosspoint devices.

16. A line concentrating circuit of a telephone switching network in accordance with claim 15 wherein said first means comprises means for connecting pairs of said rows bearing the same binary digit designation in said first stage switch to different groups of said column connected crosspoints in said second stage switch.

17. A line concentrating circuit of a telephone switching network in accordance with claim 15 wherein each said crosspoint device comprises an electromagnetically controlled relay having a remanently magnetic member of a material exhibiting a plurality of stable remanent magnetization states and a movable contact member responsive to the magnetization state of said remanently magnetic member.

18. A telephone switching network comprising a plurality of magnetically responsive crosspoints arranged in rows and columns, electromagnetic field means for controlling said crosspoints individually associated therewith and serially connected by rows and columns, pulse producing means individually associated with said rows and said columns, said row associated pulse producing means comprising a magnetic core for indicating the presence of an operated crosspoint in a particular row without releasing said crosspoint, and means connected to said column connected electromagnetic field means for detecting the column location of an operated crosspoint upon the application of a pulse from said row associated pulse producing means to release said operated crosspoint.

19. In a telephone switching network a plurality of switches each comprising a plurality of crosspoints, a plurality of lines and a plurality of links connected to said crosspoints, each of said crosspoints comprising a movable contact responsive to the magnetization condition of a pair of associated remanently magnetic elements, means for selectively controlling the magnetization condition of said crosspoints, means for ascertaining said magnetization condition of selected ones of said crosspoints without changing said condition comprising a magnetic core having a pair of stable remanent magnetization states, and means for changing the magnetization condition of said crosspoints, said last-mentioned means comprising means for changing the magnetization state of said cores, output winding means on said cores, and means connecting said output winding means to said crosspoints for affecting the magnetization condition of the associated remanently magnetic elements.

20. In a telephone switching network the combination set forth in claim 19 further comprising means associated with said crosspoints for detecting the reversal of magnetization condition therein.

21. In a telephone switching network, the combination set forth in claim 20 wherein said means for ascertaining said magnetization condition of said crosspoints comprises means for nondestructively interrogating said magnetic cores.

22. A telephone switching network comprising a plurality of lines, a plurality of links, a plurality of switches including coordinate arrays of crosspoints for selectively connecting said lines to said links, said crosspoints comprising a plurality of remanently magnetic members and a mechanical switch responsive to the remanent magnetization of said members, and means for connecting particular ones of said crosspoints by groups within a switch so as to afford a designation of the links serving a particular line in accordance with the binary code translation of the number of said lines.

23. A telephone switching network comprising a plurality of stages of relay structures, each of said structures including remanently magnetic elements, magnetically responsive contact members controlled by said elements, and control windings on said magnetic elements, means for connecting said contact members in rows and columns in each stage and for connecting said row contact members in said one stage to column contact members in the succeeding stage, a magnetic core matrix for each of said stages, each said matrix including a core of remanently magnetic material for each row in said associated stage, means connecting said cores to said relay structures for applying operating pulses to certain of said control windings connected in rows for switching the magnetization state of said magnetic elements, detection means connected to certain of said control windings connected in columns, and means connecting said detection means in one stage to said operating pulse applying means of the preceding stage.

24. A telephone switching network in accordance with claim 23 wherein said means connecting said cores to said relay structures includes output winding means on said cores, said cores being arranged in a coordinate array in each matrix, and said operating pulse applying means further includes first pulser means connected to said cores in one coordinate and connected to the detection means of the succeeding stage and second pulser means connected to said cores in the other coordinate and responsive to said first pulser means in said succeeding stage.

25. A telephone switching network in accordance with claim 24 wherein means are connected to said row control windings for terminating said windings such that a pulse of one polarity produced on switching of the magnetic state of a core in said matrix is of a current amplitude sufficient to reset the magnetic state of said relay structure magnetic elements while a pulse of the opposite polarity produced by said magnetic core is of insufficient current amplitude to set said relay elements, and further comprising vertical pulse source means connected to said column connected control windings for applying partial switching pulses for setting of said relay structure magnetic elements.

26. A multistage telephone switching network comprising a plurality of stages of switch arrays, each array comprising a plurality of electromagnetically controlled relays each having a remanently magnetic member of a material exhibiting a plurality of stable magnetization states and a movable contact member responsive to the magnetization state of said remanently magnetic member, a plurality of links for interconnecting successive ones of said stages, a memory array comprising a plurality of magnetic elements, means for writing in particular ones of said elements link condition information representative of the idle and busy condition of said links, read means for interrogating said memory array to generate information signals indicative of said link condition information, and means responsive to said information signals for controlling the operation of said relays of said arrays.

27. A line concentrating circuit for a telephone switching network comprising a plurality of decimally numbered lines, a plurality of binary numbered links, and a plurality of crosspoint switch devices arranged to connect selectively and individually each of said lines to links of a different group of said links, said crosspoint devices being further arranged such that the binary number of said last-mentioned group of links is a translation of the decimal number of the connected line.

No references cited.